United States Patent [19]
Kudsi et al.

[11] 3,813,516
[45] May 28, 1974

[54] APPARATUS FOR TEMPERATURE CONTROL FOR A HEATED ROTATING CYLINDER

[75] Inventors: Bader S. Kudsi; Ballard Terry Mahurin, both of San Jose, Calif.

[73] Assignee: International Business Machines Corporation, Armonk, N.Y.

[22] Filed: May 5, 1972

[21] Appl. No.: 250,838

Related U.S. Application Data

[63] Continuation of Ser. No. 888,625, Dec. 29, 1969, abandoned.

[52] U.S. Cl. ................ 219/471, 95/1.9, 219/216, 219/244, 219/388, 219/494, 250/65 T, 432/60
[51] Int. Cl. ............................................ H05b 3/02
[58] Field of Search ........... 219/216, 244, 251, 257, 219/388, 469, 470, 471, 494, 501, 540; 263/6 E; 73/351, 51; 250/65 T, 652 E; 95/1.9; 100/93 RP; 432/60

[56] References Cited
UNITED STATES PATENTS

| | | | |
|---|---|---|---|
| 1,758,532 | 5/1930 | Phinney | 73/351 X |
| 2,114,029 | 4/1938 | Perry | 73/51 |
| 2,701,765 | 2/1955 | Codichini et al. | 95/1.9 |
| 3,027,285 | 3/1962 | Eisner et al. | 219/244 X |
| 3,202,818 | 8/1965 | Thomiszer | 250/65 T |
| 3,239,652 | 8/1966 | Price | 219/469 |
| 3,291,466 | 12/1966 | Aser et al. | 432/60 |
| 3,437,032 | 4/1969 | Manghirmatani et al. | 100/93 RP |
| 3,621,201 | 11/1971 | Crane et al. | 219/388 |

FOREIGN PATENTS OR APPLICATIONS

| | | | |
|---|---|---|---|
| 1,530,749 | 5/1968 | France | 73/351 |

*Primary Examiner*—Volodymyr Y. Mayewsky
*Attorney, Agent, or Firm*—Otto Schmid, Jr.

[57] ABSTRACT

Apparatus for controlling the surface temperature of a heated roll which, in conjunction with a backup roll, is utilized to feed sheets for fixing tones images, for example, a heat sensing device such as a thermistor is positioned within the thermal boundary layer surrounding the heated roll to sense the temperature change of the air within the boundary layer adjacent the heated roll and to generate an electrical signal representative of the temperature changes. The signal is utilized in conjunction with a temperature controller to control the temperature of the heated roll so that the heat energy transferred to the paper sheet is accurately controlled.

5 Claims, 4 Drawing Figures

PATENTED MAY 28 1974

3,813,516

INVENTORS
BADER S. KUDSI
BALLARD TERRY MAHURIN

BY *Otto Schmid, Jr*

ATTORNEY

APPARATUS FOR TEMPERATURE CONTROL FOR A HEATED ROTATING CYLINDER

This is a continuation of application Ser. No. 888,625 filed Dec. 29, 1969, now abandoned.

BACKGROUND OF THE INVENTION

This invention relates to a method and apparatus for controlling the surface temperature of a heated rotating cylinder and more particularly to a method and apparatus for controlling the surface temperature of a heated roll of the hot roll fusing station in image reproducing apparatus.

There are applications within the printing and office copier field which require a heated rotating cylinder to impart a given amount of thermal energy to paper sheet stock being fed between the cylinder and a backup roll. One prior art system utilizes a temperature sensor imbedded in the heated cylinder with its output signal being fed through slip rings to a temperature controller. The use of the slip rings is objectionable both from the standpoint of the cost and also from the standpoint that the slip rings must be replaced periodically. A second prior art system utilizes a slider containing a sensor which rides on the external surface of the cylinder, thereby sensing the temperature. This system has some disadvantages due to the unacceptable time lag in its temperature controlling characteristics and because of the inherent effect of friction upon the sensing element output. A non-contact temperature sensor, such as an infrared temperature detector, overcomes the disadvantages of the previously mentioned prior art systems; however, the complexity and the increased cost of this system limits its use to specialized temperature sensing systems.

It is therefore a primary object of this invention to provide a method and apparatus for maintaining the surface temperature of a heated rotating cylinder at an accurately controlled temperature.

It is a further object of this invention to provide a non-contact method of temperature control which is reliable and can be implemented at low cost.

SUMMARY OF THE INVENTION

Briefly, according to the invention, there is provided an apparatus for feeding web material between a heated roll and a backing roll. A temperature sensing means is mounted within the thermal boundary layer adjacent the heated roll for sensing the temperature change of the air within the boundary layer and for generating an electrical signal varying in accordance with the temperature changes. The signal is coupled to temperature control means operative in response to the generated signal to control the temperature of the heated roll so that the radiant energy transferred to the web material as the material is fed through the roll remains substantially constant.

DESCRIPTION OF THE PREFERRED EMBODIMENT

Figure 1:
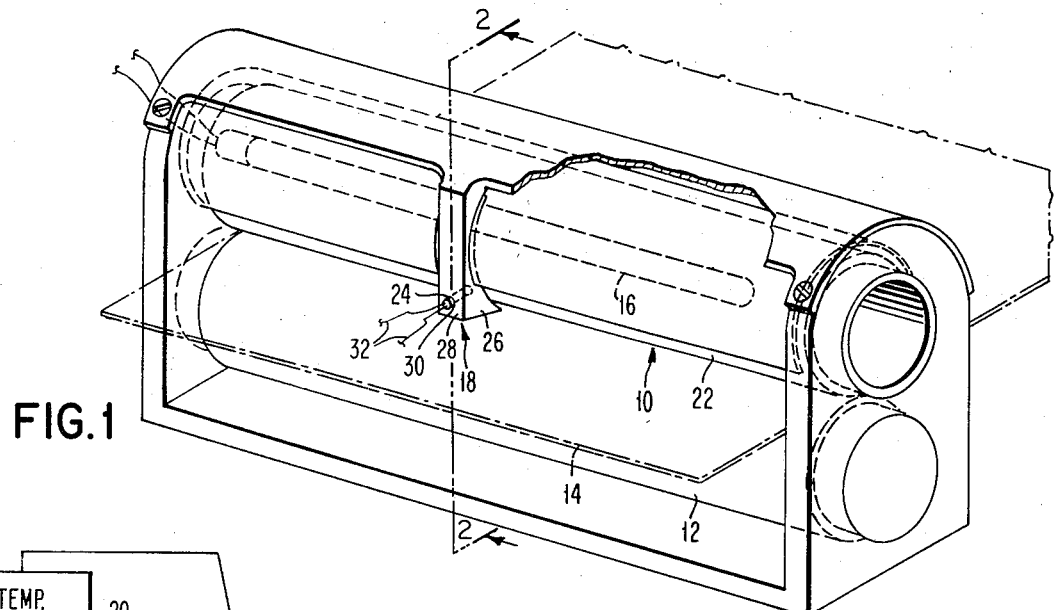
FIG. 1 is a perspective view of a hot roll fusing station embodying the invention.
Figure 2:
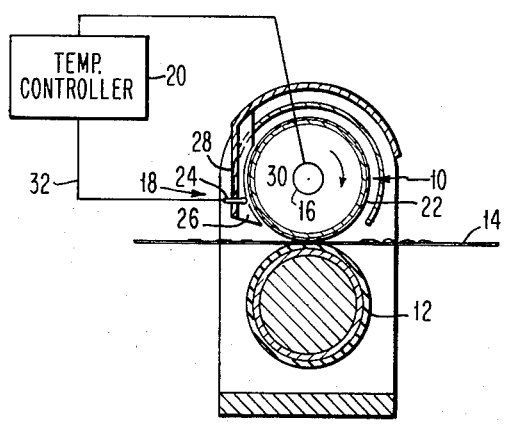
FIG. 2 is a cross-section view along the line of A—A in FIG. 1.

In the embodiment of the invention shown in the drawings, a hot roll fusing station is shown which comprises a heated feedroll 10 mounted adjacent to a backing roll 12 to permit feeding of a web material 14 when the rolls are driven by a suitable drive means not shown. Heated roll 10 is hollow and a heating means 16 is mounted inside the roll. The peripheral surface of roll 10 is maintained at an elevated temperature due to radiant heating from means 16. A temperature sensing means 18 is mounted on suitable support means which positions temperature sensing means 18 in the boundary layer surrounding the roll 10 so that the changes in temperature in the boundary layer can be sensed. The output from temperature sensing means 18 comprises an electrical signal which is coupled to temperature controller means 20 to produce signals to control the amount of heat supplied by heating means 16 to roll 10 to thereby control the surface temperature of roll 10.

In this system the sensing means does not contact the surface of roll 10 thereby eliminating many of the problems encountered in prior art devices. Many of these problems relate to the sensing and control of the surface temperature of the heated roll within a sufficiently short time to return the surface temperature of the roll to the nominal temperature by the time an incremental area of the roll again contacts the sheet (i.e. essentially one revolution of the heated roll).

Figure 4:
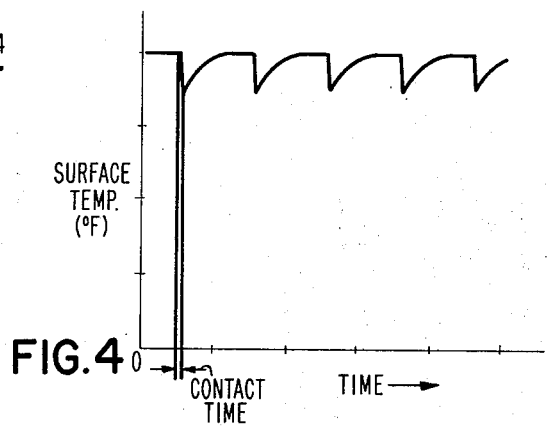
FIG. 4 is a plot of surface temperature versus time for an incremental area of the surface of the heated fusing roll.

As shown in FIG. 4 of the drawings, the temperature of an incremental area ds across the surface of the roll 10 drops rapidly in temperature from a predetermined nominal temperature when contacted by the leading edge of the web material and if sufficient heat is provided by heating source 16 the surface absorbs sufficient heat from the surrounding part of the roll so that when the stated incremental area ds again contacts the web material the surface temperature will be at the nominal temperature. The initial temperature drop occurs due to the hot roll contacting the cooler sheet stock. It can thus be seen that when sheets are fed at a speed of several inches per second, the elapsed time for effective control is a fraction of a second. For this reason all elements in the sensing and control loop must exhibit fast response.

Figure 3:
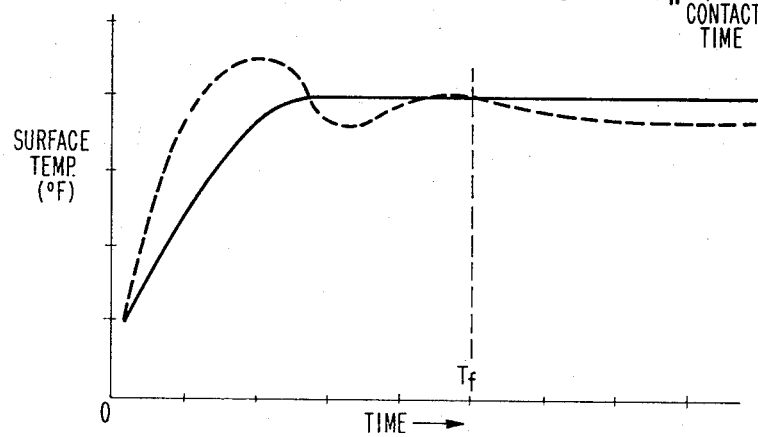
FIG. 3 is a plot of surface temperature versus time of the heated roll which forms a part of the fusing station.

Temperature response of a prior art system is shown in the dotted curve of FIG. 3. It can be seen that the temperature originally overshoots as the roll is coming up to temperature, undershoots and finally settles at the nominal value until a sheet is fed at $T_f$. When the sheet is fed the surface temperature of the roll remains below the nominal temperature for a significant time before the temperature sensing device responds. The solid curve shows the response characteristics for applicants' system and this curve demonstrates that sensing and control within the desired time frame have been achieved.

The placement of the temperature sensing means in the boundary layer surrounding roll 10 provides rapid response since a change in the temperature of an incremental area of the surface of roll 10 is reflected in a corresponding change in the temperature of air in the boundary layer practically instantly. It is known in the art (see for example the book Heat and Mass Transfer by E. R. G. Eckert and Robert M. Drake, Jr. McGraw-Hill 1959 pages 167–171) that in the thermal boundary layer, heat conduction is equal in importance to heat convection. For this reason the magnitude and rapidity of the change in the boundary layer temperature is greater than at other points in or about the hot roll with the exception of the hol roll surface and thus is easier to sense. Temperature sensing means 18 is operable to generate an electrical signal indicative of the temperature at the surface of roll 10 and this sensed value signal is coupled to a standard temperature controller the output of which is utilized to control the heat supplied to roll 10 by heating element 16.

The temperature sensing means 18 may be any suitable device having the required sensitivity to sense the temperature changes that occur at the surface of roll 10 and which also has sufficiently rapid response so that the change signal will be responded to within sufficient time to maintain the surface temperature of roll 10 at its nominal value. A bead termistor is one suitable device for temperature sensing means 18. This device comprises a small bead of semiconductive material placed between two leads and this device exhibits the property of a high negative temperature coefficient of resistivity. This property permits calibration in terms of temperature of the output of a circuit including a thermistor. This device also possesses the desired sensitivity and response time for this application.

Heating means 16 must also provide sufficiently rapid response so that the proper temperature can be maintained. In addition, the heating means must be capable of mounting within the hollow interior of roll 10. One suitable heating element is a quartz lamp which provides suitable radiant heating energy, but which operates with sufficiently fast response time for this application. Thus, the characteristics of the temperature sensing device, the heating device and the temperature controller must be matched characteristics depending upon the mass and material of the roll 10, the temperature at which roll 10 is to be maintained and the response time desired which depends on the speed of feeding of sheet 14 through rolls 10 and 12.

The embodiment of the invention shown comprises a hot roll fusing station suitable for use in an office copying apparatus. In this apparatus toner material is deposited on the sheet according to the image to be copied. The toner material is fused to the sheet to form a permanent copy by being fed through the fusing station comprising heated roll 10 and backup roll 12. For this purpose, the surface temperature of roll 10 must be kept close to a design temperature since a lower temperature may result in imperfect fusing of the toner to the sheet. If the roll is at a temperature greater than the design temperature, the quality of the copy may be affected as well as increasing the danger of discoloring or burning the copy sheet.

The heated roll may be constructed from any suitable material, but a material having a high thermal diffusivity is desired. One suitable material for roll 10 is copper. In the embodiment of the fusing station shown, a thin coating 22 of silicone rubber is provided on roll 10 to prevent the toner material from sticking to that roll. After undergoing a temperature disturbance at the surface, the resulting rate of change in temperature with respect to time in the roll's interior is directly proportional to the thermal diffusivity. The thin rubber coating acts as a thermal insulator so that when the sheet contacts roll 10 the surface temperature drops rapidly. This drop results in a rapid cooling of the adjacent air in the boundary layer, thereby providing a rapid signal indication of the temperature change.

In the embodiment shown, the temperature sensing means comprises a bead thermistor 24 which is mounted on suitable support means rigidly attached to the machine frame to hold thermistor 24 spaced a predetermined distance from the surface of roll 10. The support means comprises two upstanding side members 26 connected by a center support member 28. Side support members 26 have a marginal shape complementary to roll 10 so that these members can be mounted close to the surface of roll 10 to provide with member 28 an open-ended enclosure within which the boundary layer surrounding roll 10 is essentially undisturbed. Thermistor 24 is mounted in an opening 30 in member 28 and extends into the boundary layer for sensing the temperature. The marginal edges of members 26 extend closer to the surface of roll 10 than thermistor 24 so that these members can serve as a guard to prevent damage to the thermistor in the event a sheet wraps around roll 10. Electrical leads 32 are connected from thermistor 24 to temperature controller means 20 to conduct signals to the controller.

The angular position of thermistor 24 about roll 10 is not critical. However, the angular position does have some effect on the control obtainable, so the angular position should be considered if close control is required. The thermistor should be mounted on the side of roll 10 at which the web material exits since this position permits sensing the area of the roll just cooled by contact with the sheet. The proper angular location of the thermistor is a function of roll velocity and material properties and this position can easily be determined experimentally for a particular embodiment.

By the use of applicant's invention the surface temperature of roll 10 was maintained in one embodiment to the nominal temperature of 400°F. ± 10° with the use of a standard temperature controller. A Fenwal Controller Model 561 obtainable from Fenwal, Inc., Ashland, Massachusetts, was utilized for temperature controller means 20. A thermistor with characteristics matched for use with this controller was used. The controller monitors a circuit including the thermistor and on the basis of the output from the monitoring circuit the controller regulates the temperature of roll 10 by turning heat source 16 ON or OFF. A small dead band about the nominal temperature is included so that the heat source 16 will not be continuously cycled OFF and ON. In this embodiment, with the roll temperature at 400°, the temperature sensed in the boundary layer with the thermistor spaced 0.010 of an inch from the roll surface was 325°. The temperature drop sensed in the boundary layer was 20° with the thermistor mounted 50° radially from the nip of the rolls with the web moving at a velocity of 32 inches per second. If it is then desired to change the nominal temperature, it is necessary only to change the set point on the temperature controller to the revised temperature.

While the invention has been particularly shown and described with reference to a preferred embodiment thereof, it will be understood by those skilled in the art that various changes in the form and details may be made therein without departing from the spirit and scope of the invention.

What is claimed is:

1. A hot roll fuser apparatus for fusing image forming thermoplastic toner material to a sheet comprising:
   a heated roll mounted in nip forming relationship with a backup roll for feeding a sheet,
   means for driving said heated roll for rotation in a surrounding medium to produce a thermal boundary layer in said surrounding medium;
   a temperature sensing means and means for mounting said temperature sensing means for sensing the temperature change due to heat exchange to a degree by convection and at least to an equal degree by conduction from the heated roll to the surrounding medium in the boundary layer and means for generating an electrical signal representative of temperature changes within said boundary layer;
   an electrically operated heat source for heating said heated roll; and
   temperature controller means responsive to said generated electrical signal from said temperature sensing means to control the electric energy supplied to said heat source to maintain the surface of said heated roll at a predetermined temperature so that the toner is completely fused to the sheet as the sheet is fed through the hot roll fuser apparatus.

2. The apparatus according to claim 1 wherein said temperature sensing means is mounted within the boundary layer on the side of the heated roll at which the web material is fed from said roll.

3. The apparatus according to claim 2 wherein said temperature sensing means is mounted in an angular position around said heated roll of less than ninety degrees from the contact line between said roll and the web material.

4. The apparatus according to claim 1 wherein said heated roll has a thin insulating covering thereon.

5. The apparatus according to claim 1 wherein said temperature sensing means is a thermistor.

* * * * *